Aug. 13, 1935.    L. F. CARTER    2,011,436
GYROSCOPIC COMPASS
Filed Oct. 5, 1932    2 Sheets-Sheet 1

INVENTOR
Leslie F. Carter
BY
Joseph N. Lipschutz
ATTORNEY

Aug. 13, 1935.  L. F. CARTER  2,011,436
GYROSCOPIC COMPASS
Filed Oct. 5, 1932  2 Sheets-Sheet 2

INVENTOR
Leslie F. Carter
BY
ATTORNEY

Patented Aug. 13, 1935

2,011,436

UNITED STATES PATENT OFFICE 2,011,436

GYROSCOPIC COMPASS

Leslie F. Carter, Leonia, N. J., assignor to Sperry Products, Inc., Brooklyn, N. Y., a corporation of New York Application October 5, 1932, Serial No. 636,269

7 Claims. (Cl. 33—226)

This invention relates to gyroscopic compasses and has for its object the provision of a compass of this type which shall be non-pendulous and therefore free of acceleration errors. This invention is an improvement over the compass disclosed in my copending application Serial No. 551,138 filed July 16, 1931.

The present invention relates to the same type of compass as disclosed in my said copending application, namely, to a gyroscopic compass having its spinning axis inclined in an E—W plane at a predetermined angle to the verticle. In this way, the W—E component of the earth's rotation is utilized to give a quick response of the gyro, resulting in a more rapid rate of orientation toward the meridian than in existing compasses. Other advantages of such a compass as disclosed in said copending application are the fact that the compass is deadbeat, that no ballistic mechanism is employed to impart precessional movements to the sensitive element, that no compensating weights are required to make the sensitive element symmetrical about its vertical axis and therefore undisturbed by rolling and pitching movements of the vessel, that the expansion of the rotor on heating does not introduce an error in the settling point of the compass, and that the gyro casing is normally disconnected from any energy-abstracting device and is therefore free of turning error.

In the compass disclosed in said copending application there was utilized a baseline in the form of a ring stabilized by a stabilizing gyro. One of the principal objects of my invention is to provide an alternative mechanism for said stabilizing ring and stabilizing gyro by providing a damped liquid level device which is substantially unaffected by acceleration forces.

A further object of my invention is to provide in combination with said damped liquid-level device which is unresponsive to acceleration forces of short duration, a turn-responsive means such as a turn-indicator gyro which is responsive to rates of yaw which are faster than the damped liquid-level would respond to and thereby retain the slower leveling action of the liquid-level for the purpose of operating the follow-up system in response to the earth's tilting effect which produces the north seeking action of the compass.

A further object of this invention is to provide means whereby a speed and course corrector is employed for establishing a new settling position of the compass whenever a new course is entered upon, since the settling point of the compass should be the resultant of the direction and speed of the earth's rotation and the direction and speed of the craft on which the compass is mounted.

Still further objects of my invention will become apparent in the following detailed description thereof:

In the accompanying drawings,

Fig. 4 is a wiring diagram showing the electrical connections between the parts comprising the compass of Figs. 1 and 3.

Figure 1:
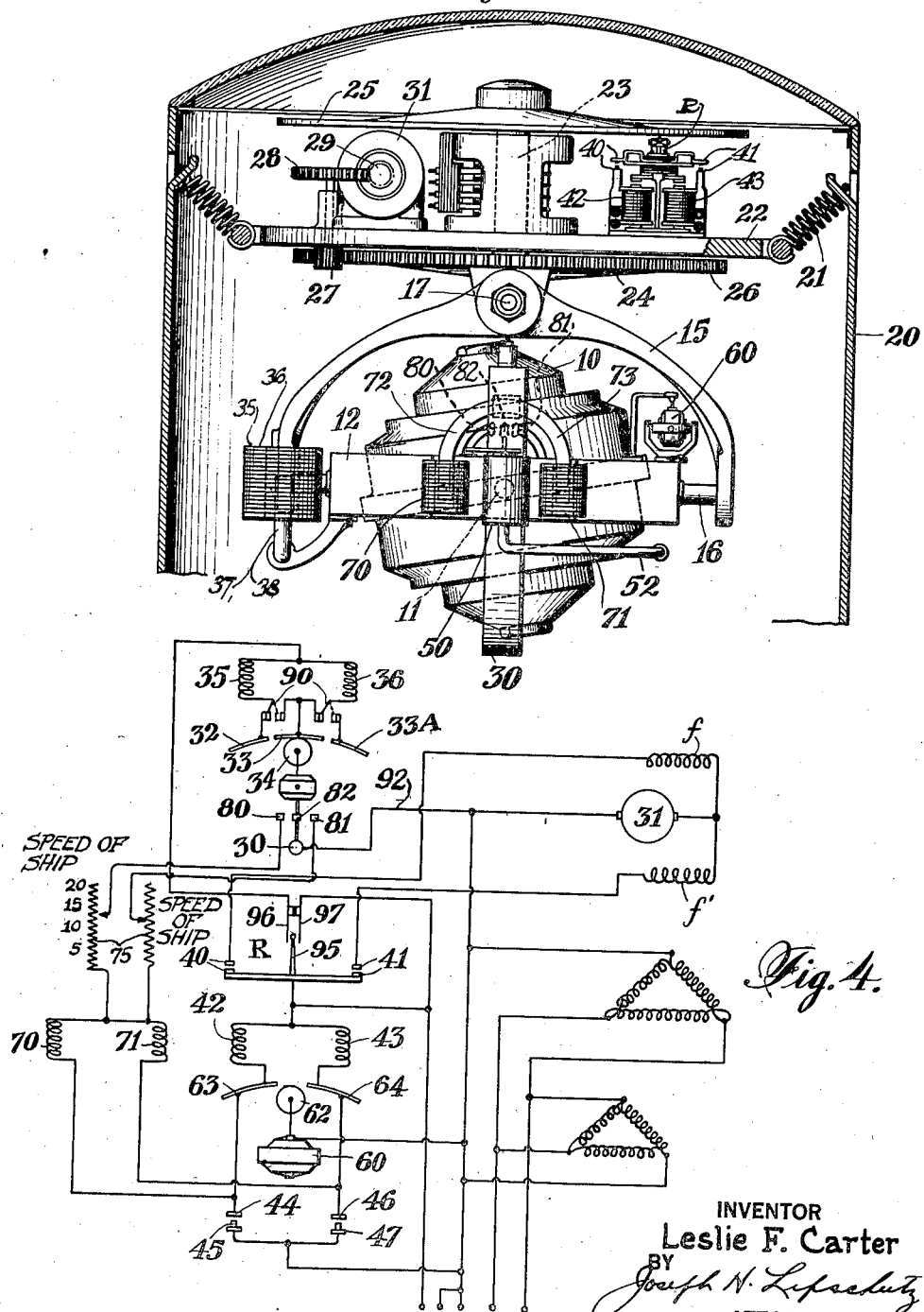
Fig. 1 is a front elevation of a gyroscopic compass with an enclosing binnacle partly sectioned vertically and partly removed.

Referring to the drawings, I have shown a gyroscopic compass which comprises a rotor journalled within a casing 10, said casing being mounted for oscillation about an axis 11 within a gimbal ring 12, said ring being in turn journaled for oscillation within a frame or yoke 15 about an axis 16. The said frame or yoke 15 is supported from the binnacle 20 by means of a plurality of springs 21 supporting a plate 22 within which a plate 24 is journalled for rotation about a vertical axis by a shaft 23. The yoke 15 is suspended from the lower side of said plate for oscillation about an axis 17. The said shaft 23 carries at its upper end a compass card 25 and the plate 24 may have formed around its periphery an annular gear 26 with which is designed to mesh a pinion 27 which may be driven by suitable gearing 28, 29 from an azimuth motor 31 supported upon the fixed plate 22. By this means, the entire sensitive element of the compass including card 25, yoke 15 and gyro 10 may be rotated in azimuth about a vertical axis.

Figure 2:
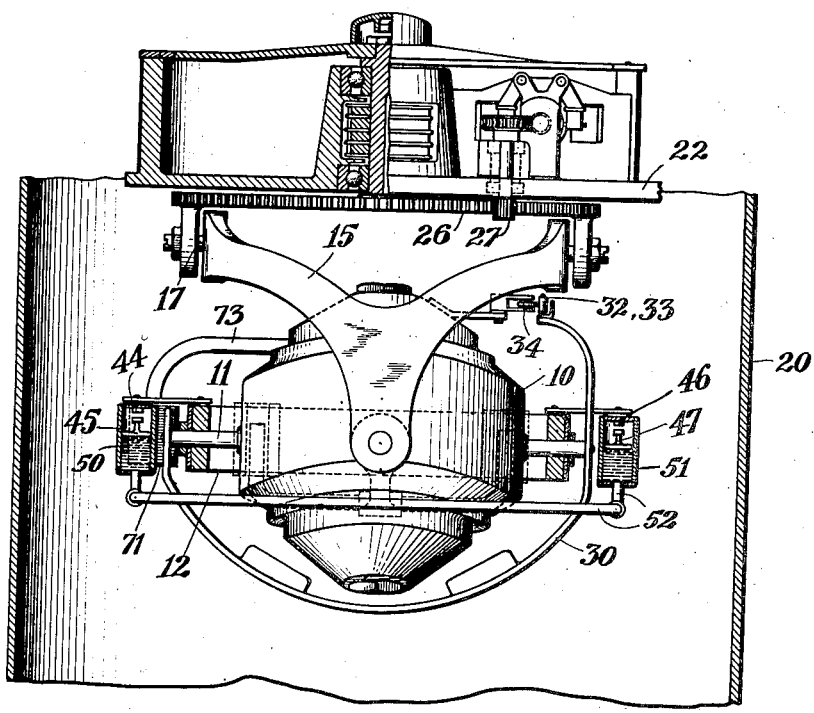
Fig. 2 is a view similar to Fig. 1 taken at right angles thereto.
Figure 3:
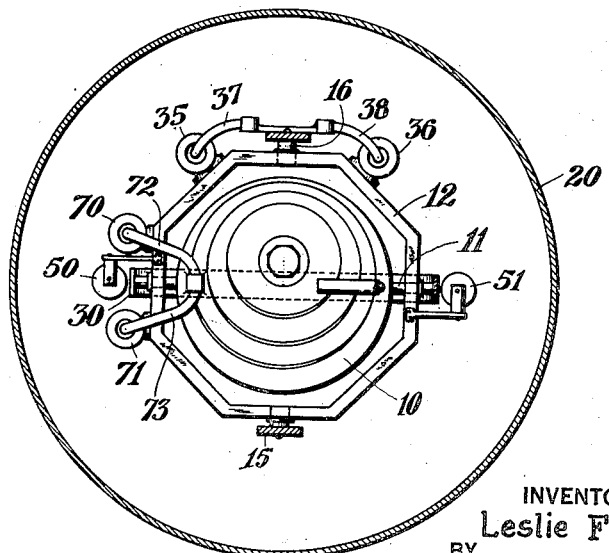
Fig. 3 is a plan view of the compass disclosed in Figs. 1 and 2.

The gyro and its enclosing casing 10 is mounted upon the axis 11 in neutral equilibrium so that it will remain in any position in which it is placed. I prefer to maintain this gyro element with its spinning axis at a predetermined inclination with respect to the vertical in an E—W plane. If the gyro can be so maintained, then the axis of support 11 will be in the meridian. In other words, the axis 11 will determine N—S while the spinning axis of the gyro will be inclined in a plane at right angles to the meridian, in other words, in an E—W plane. In order to hold the gyro with its spinning axis at a given angle to the vertical, I may provide means such as a pendulous bail 30 (see Fig. 2)

for maintaining a vertical baseline and carrying a pair of spaced contacts 32, 33. The gyro case is provided with a trolley 34 fixed thereto and so positioned with respect to the case that when the gyro axis is inclined with respect to the vertical the predetermined amount, said trolley will rest upon both contact segments 32 and 33. Said contact segments control the circuit through a pair of solenoids 35 and 36 (see Fig. 3) mounted on yoke 15 which coacts with core members 37, 38 fixed to ring 12. When trolley 34 is in engagement with both contacts 32 and 33 the core members 37, 38 are attracted equally and oppositely; but when trolley 34 moves off one of the contact segments, one of the magnets 35, 36 is de-energized and the core of the energized solenoid exerts a torque around the horizontal axis 16 in the proper direction to cause precession around axis 11 to restore the inclination of the gyro to its original degree, in other words, to the position where trolley 34 again rests upon both segments 32 and 33. I have thus provided a means for maintaining the gyro axis inclined to the vertical at a constant angle regardless of any angular displacements due to the rotation of the earth or to forces such as friction which would tend to change such angle.

I have also provided means for orienting the compass in azimuth. Whenever there is yawing of the ship on which the compass is mounted, there is a tendency to carry yoke 15 and the entire gyro around in azimuth; or, due to the prolonged action of the earth's rotation, the axis of the gyro may acquire a N—S component of tilt. Whenever, due to any of these conditions, the gyro spinning axis moves out of the E—W plane, such movement causes the ring 12 to tilt out of the position which it normally maintains since such ring is being rotated about the inclined axis of the gyro and not around a vertical axis. The tilt of the ring 12 around axis 16 when the gyro spinning axis moves to north or south is utilized to transfer fluid from one side of a liquid-level device to the other, and such transfer of fluid is caused to control the azimuth motor 31 to energize the same in the proper direction and restore the gimbal system to its original position relative to the spinning axis in the E—W plane. The azimuth motor is controlled by the liquid-level device through means such as a relay R having two sets of contacts 40 and 41 controlling the circuit to the opposite fields $f$, $f'$ of the reversible azimuth motor 31. The said pairs of contacts 40, 41 are selectively controlled by magnets 42, 43 energized from the liquid-level by means of a fixed contact 44 and a floating contact 45 which controls through solenoid 42 and a fixed contact 46 a floating contact 47 which controls the circuit through solenoid 43. It will be understood that as the spinning axis of the compass tilts to north or south one pair or the other of said two pairs of contacts 44, 45 or 46, 47 will be closed to energize the azimuth motor 31 in the proper direction to restore ring 12 to horizontal by turning the gimbal system in azimuth in accordance with the movement of the spinning axis of the gyro.

The liquid-level device comprises reservoirs 50, 51 joined by a constricted tube 52, said constricted tube serving to damp the flow of fluid therethrough and thus make the device substantially unresponsive to acceleration forces of short duration. This would leave the compass responsive to acceleration forces of relatively long duration such as those caused by turning of the ship into a new course but not responsive to yawing movements.

In order to make the compass responsive to yawing movements, I may provide an instrument such as a two-degree of freedom turn indicator type gyro 60 which may be mounted in any convenient position such as on the ring 12 where it will respond to turning. By referring to the wiring diagram of Fig. 4, it will be seen that said gyro 60 may also control the circuits through solenoids 42, 43, the relay R, and the fields $f$, $f'$ of azimuth motor 31. Such control may be effected through means such as a trolley 62 engaging contact segments 63, 64. Said trolley 62 carried by the gyro may normally be in engagement with both contact segments 63, 64 so that when the gyro precesses in response to yaw trolley 62 will engage only one of said contact segments to de-energize one of the coils 42, 43, leaving the other one effective to energize motor 31 in the proper direction to restore the compass gimbal system to its normal position with respect to the E—W inclination of the main gyro 10. Thus, I have devised a dual parallel control of the azimuth motor, one for the north-seeking function by means of the liquid-level control contacts 44, 45 and 46, 47 which are responsive to the slow tilting movements of ring 11 resulting from earth rotation, and the other through trolley 62 and contacts 63, 64, which control is responsive to the more rapid and sudden tilting of ring 11 resulting from yawing and change of course of the vessel.

When turning occurs, the tilt-control pendulum 30 is thrown outwardly by reason of the acceleration forces acting thereon and no longer maintains a true vertical. It is therefore desirable to cut out the action of the dual control mechanism when turning occurs. I may accomplish this by utilizing the movements of the armature of azimuth motor relay R which is actuated when turning occurs, said relay having a switch 95 designed to engage one or the other of a pair of spring contact members 96, 97 controlling the circuit through the tilt-control magnets 35, 36. There is a certain amount of play between switch 95 and spring contacts 96, 97 to allow for ordinary weather yawing movements without throwing out of action the tilt-control magnets 35, 36.

The theory of operation of my compass is the same as disclosed in my copending application. If the gyro is set spinning at the equator with the axis of control 11 in the meridian, that is, pointing N—S, then the only tendency to movement of the gyro will be around the axis 11, or in other words, the only tendency to movement of the gyro axis will be in an E—W plane with the upper end of the gyro tending to move downwardly to meet the earth, that is, tending to increase the angle of inclination. This tendency is quickly and effectively counteracted by the trolley 34, contact segments 32, 33 and magnets 35, 36, as hereinbefore described. If the gyro is set in operation with the axis 11 not in the meridian, then the action of the earth in rotating will lower a point on the rim of the gyro corresponding to due west, or in other words the earth will cause the gyro 10 and ring 12 to tilt around axis 16 and this in turn will cause a transference of liquid in the liquid-level device to operate the azimuth motor as hereinbefore described to turn the gyro case and gimbal system in azimuth until the axis of controlled tilt 11 has been returned to its stable position in the meridian.

The operation as described is true in any other latitude because when the axis of oscillation 11 in any latitude is in the meridian, then the only response of the gyro axis to the earth's rotation for a considerable period of time is in the E—W plane and is counteracted by the magnets 35, 36. If the axis 11 is not in the meridian, then there will be a N—S component of tilt of the gyro axis which will cause the gyro case and gimbal system to be rotated in azimuth until the inclined gyro axis is in the E—W plane and the axis of oscillation 11 is in the meridian.

When the ship yaws, the same operation takes place as hereinbefore described, since the gyro axis tends to maintain its position in space and thus there is caused a rotation of ring 12 around an inclined axis. The yawing movement is of relatively short duration and the liquid level device is damped, so that said yawing does not result in transferring sufficient fluid in the liquid-level device to energize the azimuth motor. Such energization is effected, however, by the turn-responsive gyro 60 acting through trolley 62 and contacts 63, 64 to energize the azimuth motor in the proper direction to restore axis 11 in the meridian, in other words, to rotate the gyro casing and gimbal system in a direction contrary to the direction of yaw of the ship. Gyro 60 is a free gyro and will reverse its direction of precession as soon as the axis 11 starts back to the meridian but will not cause trolley 62 to engage the other of said contacts 63, 64 until the axis 11 has traversed substantially the arc back to the meridian. There is no spring which pulls the gyro quickly to one end of its swing or the other, the said gyro precessing in synchronism with the angular movement of the gyro support in azimuth. It will be understood that the angle of yaw is very small.

When the gyro is first set into operation it frequently occurs that the spinning axis may be removed as much as 180° from its final resting position. In order to cause the compass to reach its resting position quickly, it is desirable that the inclination of the gyro spinning axis with respect to the vertical be made quite small, because this results in a more rapid orientation toward the resting position. During normal operation, however, such a small angle of inclination with respect to the vertical would result in a compass that was too sensitive for best operation in regard to fixity of meridian indication, and therefore it is desirable to operate at a substantially larger inclination of the gyro axis with respect to the vertical. For this reason, I have provided means whereby I am enabled to start the gyro in operation with a tilt somewhat on the order of 3 to 5 degrees for quick settling, and may then change said tilt to one on the order of 10 to 14 degrees for normal operation. To accomplish this purpose I have provided in addition to the contact segments 32, 33 still another contact segment 33A in the circuit between magnets 35 and 36. I have interposed a double throw switch 90 which in the full line position is effective to include contact segments 32, 33 in circuit with magnets 35, 36, but when thrown to dotted line position is effective to place contact segments 33 and 33A in circuit with said magnets. Thus, in starting, contacts 32, 33 may be effective to maintain a relatively small inclination of the gyro axis with respect to the vertical, but when the gyro has reached its settling position the switch 90 is thrown to render contact segments 33, 33A effective, and trolley 34 now coacts with said last-named contact segments to provide a larger angle of inclination of said gyro axis.

When the craft on which the gyroscopic compass is mounted turns into a new course, a new settling position will be taken up by the compass in due time, this settling position being the resultant of the direction and speed of the earth and the direction and speed of the ship. It is desirable in all gyroscopic compasses that the sensitive element of the gyroscope be brought around into the new settling position by the time the ship reaches its new course, that is, during the turning period. Otherwise, while the compass would eventually settle in the new position, it would for a long time give an incorrect indication. I accomplish this course correction by taking advantage of the fact that the liquid level device responds only to such turning movements, that is, turning into a new course, which is a long-period turning force. For this purpose I provide a pair of solenoids 70, 71, mounted upon the ring 12, cooperating with core members 72, 73 fixed to the gyro case so that said solenoids place a torque on the gyro around the axis 11 which will cause precession of the gyro spinning axis in the N—S direction around axis 16 to a degree sufficient to cause the azimuth motor to move the compass into its new settling position. I may provide in the circuit through the said solenoids resistances 75 which may be calibrated in terms of speed of the ship so that the correction introduced by said solenoids will be a function of the speed of the ship.

It will be observed that the return 92 from solenoids 70, 71 lies through a set of contacts 80, 81 cooperating with a contact 82 carried by the pendulum 30 of Fig. 1. There is a certain clearance allowed between contacts 80, 81 on the one hand and contact 82 on the other which corresponds to the amount that pendulum 30 is actuated by normal yaw of the craft. Thus, in normal yaw, the circuit is not closed between contact 82 and one of the contacts 80 or 81, and therefore the return 92 from solenoids 70, 71 is open and such solenoids are ineffective to introduce a course correction during normal yawing movements of the vessel. It is only when such movements exceed yawing movements, as in the case when a vessel is turned to a new course, that the circuit will be closed between contact 82 and one of the contacts 80, 81 to render the circuit through solenoid 70 or 71 effective to introduce a course correction.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro compass comprising a gyroscope, means for supporting said gyroscope for tilting about an axis, means for maintaining the spinning axis of the gyroscope at a predetermined relatively small inclination to the vertical in an E—W plane, means responsive only to turning movements of said support in azimuth in excess of normal yawing movement, means responsive to turning movements of said support in azimuth equal to or less than normal yawing movements and a single means controlled by each of said responsive means for rotating said supporting means in azimuth to maintain said tilting axis in the meridian.

2. In a gyro compass comprising a gyroscope, means for supporting said gyroscope for tilting about an axis, means for maintaining the spinning axis of the gyroscope at a predetermined relatively small inclination to the vertical in an E—W plane, damped liquid level means responsive only to turning movements of said support in azimuth in excess of normal yawing movement, means responsive to turning movements of said support in azimuth equal to or less than normal yawing movements, and a single means controlled by each of said responsive means for rotating said supporting means in azimuth to maintain said tilting axis in the meridian.

3. In a gyro compass comprising a gyroscope, means for supporting said gyroscope for tilting about an axis, means for maintaining the spinning axis of the gyroscope at a predetermined relatively small inclination to the vertical in an E—W plane, damped liquid level means responsive only to turning movements of said support in azimuth in excess of normal yawing movement, a two-degree-of-freedom gyro responsive to turning movements in azimuth equal to or less than normal yawing movements, and a single means controlled by each of said responsive means for rotating said supporting means in azimuth to maintain said tilting axis in the meridian.

4. In a gyro compass comprising a gyroscope, means for supporting said gyroscope for tilting about two horizontal, mutually-normal axes, means for maintaining the spinning axis of the gyroscope at a predetermined relatively small inclination to the vertical about one of said axes, means including a liquid level responsive to pivotal movement of said gyroscope about the other of said axes, and means controlled by said liquid level means for rotating said supporting means in azimuth to maintain said first axis in the meridian.

5. A gyro compass comprising a gyroscope, means for supporting said gyroscope, and means for selectively causing the compass to settle at one of a plurality of rates of speed, said means comprising means for selectively maintaining the spinning axis of said gyroscope at one of a plurality of predetermined inclinations to the vertical in an E—W vertical plane.

6. A gyro compass comprising a gyroscope, means for supporting said gyroscope, and means for selectively causing the compass to settle at one of a plurality of rates of speed, said means comprising means for selectively maintaining the spinning axis of said gyroscope at one of a plurality of relatively small predetermined inclinations to the vertical, said last named means comprising a two-part control means, one of said parts being vertically stabilized, the other of said parts being carried by said gyroscope, one of said parts bearing a trolley and the other of said parts a plurality of contacts more than two in number and arranged so that adjacent contacts may cooperate with said trolley, circuit means including said contacts and trolley, and switch means for selectively placing any two adjacent contacts in cooperative relation with said trolley.

7. In a gyro compass of the type having its spin axis inclined a relatively small angle from the vertical when operating, means for selectively varying said angle comprising a vertically stabilized part, a second part carried by the gyro casing, one of said parts bearing three contacts and the other part bearing a trolley movable over said contacts as the inclination of the spin axis changes, circuit means including said contacts and trolley for controlling the inclination, and switch means for placing the circuit under control of the middle contact and a selected one of the remaining contacts in coaction with said trolley.

LESLIE F. CARTER.